United States Patent [19]

Tsujimoto et al.

[11] Patent Number: 5,790,200
[45] Date of Patent: Aug. 4, 1998

[54] HORIZONTAL SYNCHRONIZATION SIGNAL STABILIZATION METHOD AND APPARATUS

[75] Inventors: Hiroyuki Tsujimoto; Masayuki Sohda, both of Yamato; Hirokazu Nishimura, Sagamihara, all of Japan

[73] Assignee: International Business Machines Corporation, Armonk, N.Y.

[21] Appl. No.: 535,606

[22] Filed: Sep. 28, 1995

[30] Foreign Application Priority Data

Sep. 28, 1994 [JP] Japan ............................. 6-232719

[51] Int. Cl.$^6$ .......................................... H04N 5/12
[52] U.S. Cl. ........................ 348/545; 348/533; 348/536
[58] Field of Search .................... 348/533, 534, 348/535, 521, 524, 536, 537, 540, 541, 542, 545, 546, 547, 548, 530, 531; 358/150, 155, 158; 375/375, 376; 331/20; 327/159; H04N 5/12, 5/08, 5/06

[56] References Cited

U.S. PATENT DOCUMENTS 4,780,759 10/1988 Matsushima et al. ............... 348/537
4,974,081 11/1990 Yokogawa ............................ 358/148
5,502,502 3/1996 Gaskill et al. ........................ 348/546

FOREIGN PATENT DOCUMENTS 5056304 3/1993 Japan .................... H04N 5/12

Primary Examiner—Christopher C. Grant
Attorney, Agent, or Firm—Scully, Scott, Murphy and Presser

[57] ABSTRACT

An arrangement for stabilizing a horizontal synchronization signal, serving as an input signal for a phase-locked loop (PLL) for generating a clock signal, by separating the horizontal synchronization signal from a composite synchronization signal including both horizontal and vertical synchronization signals. A horizontal synchronization gate signal is generated for outputting a pulse signal approximately in phase with the horizontal synchronization signal and having at least the pulse width of the horizontal synchronization signal in accordance with the composite synchronization signal and a clock pulse signal having a predetermined frequency. The horizontal synchronization signal is retrieved from the composite synchronization signal in accordance with a logical product when matching the polarity of the horizontal synchronization gate signal with the polarity of the composite synchronization signal.

10 Claims, 4 Drawing Sheets

VERTICAL SYNCHRONIZATION SIGNAL REGION

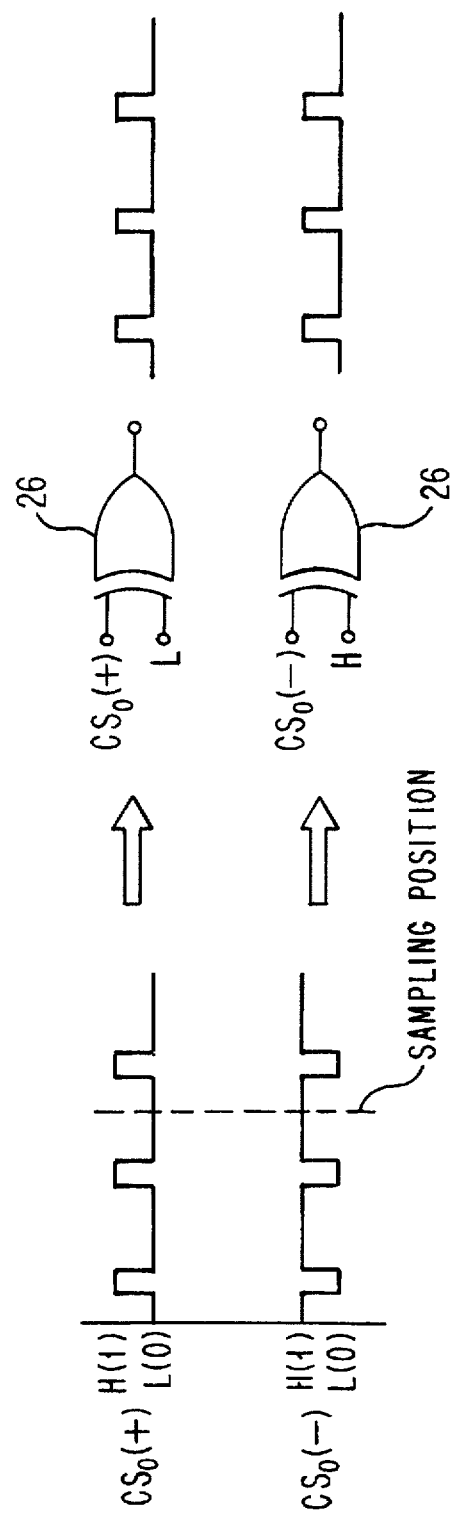

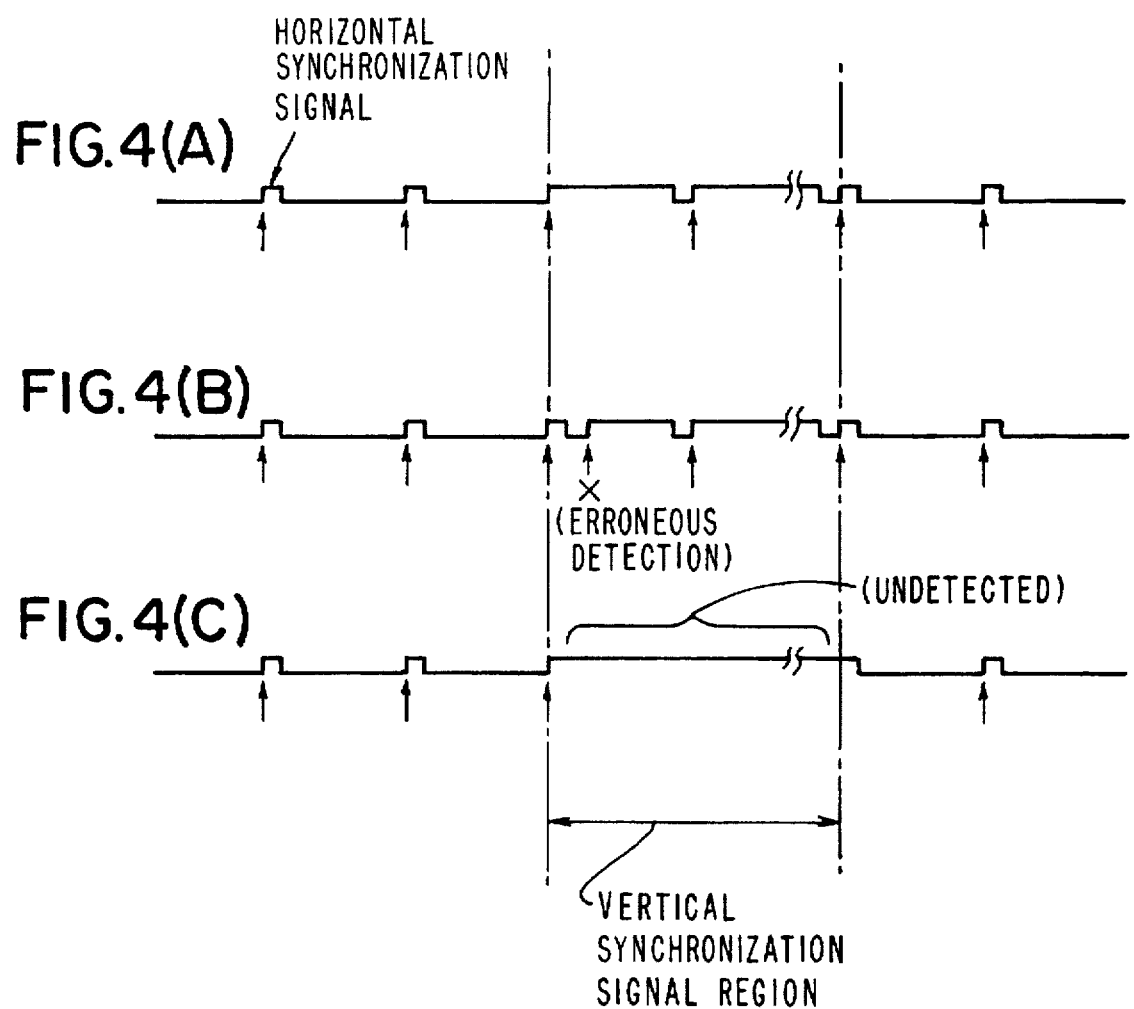

1

HORIZONTAL SYNCHRONIZATION SIGNAL STABILIZATION METHOD AND APPARATUS

FIELD OF THE INVENTION

The present invention relates to a horizontal synchronization signal stabilization method and apparatus for stabilizing a horizontal synchronization signal serving as an input signal for a phase-locked loop (PLL) for generating a clock signal by separating the horizontal synchronization signal from a composite synchronization signal including horizontal and vertical synchronization signals.

BACKGROUND ART

A composite synchronization signal (composite signal) including horizontal and vertical synchronization signals includes the types shown in FIGS. 4(A) to 4(C).

The difference between these types of signals lies in presence or absence of a signal in a vertical synchronization signal region. Although details are described later, even if a horizontal synchronization signal (pulse signal) is not present at a section where a horizontal synchronization signal and a vertical synchronization signal are superimposed on each other, an image to be displayed is hardly affected because the specification of the timing of an input signal is comparatively rough in the case of a CRT display.

However, in the case of a liquid crystal display (LCD) of an analog interface, it is an indispensable requisite to stabilize a signal input to a PLL, particularly to generate a horizontal synchronization signal at a certain period continuously because a dot clock is regenerated by using the PLL and output signal timing for the LCD is obtained in accordance with the dot timing.

Characteristics of the signals in FIGS. 4(A) to 4(C) are described below.

In the case of the signal in FIG. 4(A), a signal is generated synchronously with a horizontal synchronization signal even in a vertical synchronization signal region and therefore, it is possible to retrieve or fetch the horizontal synchronization signal even from the vertical synchronization signal region by detecting the leading edge of the signal synchronized with the horizontal synchronization signal.

In the case of the signal in FIG. 4(B), a pulse signal (a so-called cirrus) is present at the position of a period different from a horizontal synchronization signal and, therefore, detection of the cirrus may cause a malfunction in a PLL.

In the case of the signal in FIG. 4(C), because there. is no signal corresponding to a horizontal synchronization signal in a vertical synchronization signal region, it is impossible to fetch a horizontal synchronization signal from the region.

However, generating a horizontal synchronization signal by a forecast in the region of a vertical synchronization signal in all input signals impairs accuracy, makes the processing in a PLL unstable, and causes image disturbances when a signal capable of accurately taking a horizontal synchronization signal as shown in FIG. 4(A) or a signal capable of taking a horizontal synchronization signal by removing the cirrus as shown in FIG. 4(B) is input.

SUMMARY OF THE INVENTION

The present invention is made to solve the above problems and its object is to provide a horizontal synchronization signal stabilization method and apparatus for continuously converting even different types of input composite signals to signals for stabilizing the processing in a PLL.

A first aspect of the invention provides a horizontal synchronization signal stabilization method for stabilizing a horizontal synchronization signal serving as an input signal for a phase-locked loop (PLL) for generating a clock signal by separating the horizontal synchronization signal from a composite synchronization signal including horizontal and vertical synchronization signals, comprising the steps of generating a horizontal synchronization gate signal for outputting a pulse signal approximately in phase with the horizontal synchronization signal and having at least the pulse width of the horizontal synchronization signal in accordance with the composite synchronization signal and fetching the horizontal synchronization signal from the composite synchronization signal in accordance with a logical product when matching the polarity of the horizontal synchronization gate signal with the polarity of the composite synchronization signal.

A second aspect of the invention is characterized in that the horizontal synchronization gate signal becomes active a predetermined time before a horizontal synchronization signal in the composite synchronization signal becomes active.

A third aspect of the invention provides a horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising a horizontal synchronization gate signal generation section for generating a horizontal synchronization gate signal for outputting a pulse signal approximately in phase with the horizontal synchronization signal and having at least the pulse width of the horizontal synchronization signal in accordance with the composite synchronization signal and output means having an AND gate for computing a logical product when matching the polarity of the horizontal synchronization gate signal generated by the horizontal synchronization gate signal generation section with the polarity of the composite synchronization signal and outputting a signal output from the AND gate to the PLL as the horizontal synchronization signal.

A fourth aspect of the invention is characterized in that the horizontal synchronization gate signal generation section is provided with a margin for making the horizontal synchronization gate signal active a predetermined time before at least the horizontal synchronization signal becomes active.

A fifth aspect of the invention provides is a horizontal synchronization signal stabilization method for stabilizing a horizontal synchronization signal serving as an input signal for a phase-locked loop (PLL) for generating a clock signal by separating the horizontal synchronization signal from a composite synchronization signal in which no horizontal synchronization signal is present in the regional range of a vertical synchronization signal, comprising the steps of discriminating the region of the vertical synchronization signal from the composite synchronization signal and generating a pseudo horizontal synchronization signal having a change point approximately matching the change point of a horizontal synchronization signal detected from the composite synchronization signal in the range of the vertical synchronization signal region.

A sixth aspect of the invention provides a horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising a discrimination means for discriminating the region of the vertical synchronization signal from the composite synchronization signal, a pseudo horizontal synchronization signal generation section for generating a pseudo horizontal synchronization signal having a change point approximately matching the change point of a horizontal synchronization signal detected from the composite synchronization signal in the range of the vertical synchronization signal region, and an output means having an AND gate for computing a logical product when matching the polarity of the pseudo horizontal synchronization signal generated by the pseudo horizontal synchronization signal generation section with the polarity of the composite synchronization signal and outputting a signal output from the AND gate to the PLL as the horizontal synchronization signal.

A seventh aspect of the invention provides a horizontal synchronization signal stabilization method for stabilizing a horizontal synchronization signal serving as an input signal for a phase-locked loop (PLL) for generating a clock signal by separating the horizontal synchronization signal from a composite synchronization signal including horizontal and vertical synchronization signals, comprising the steps of discriminating the region of the vertical synchronization signal from the composite synchronization signal, generating a horizontal synchronization gate signal in accordance with the composite synchronization signal when the horizontal synchronization signal is present in the region of the vertical synchronization signal, fetching the horizontal synchronization signal from the vertical synchronization signal region by computing a logical product when matching the polarity of the horizontal synchronization gate signal with the polarity of the composite synchronization signal, and generating a pseudo horizontal synchronization signal approximately matching the horizontal synchronization signal detected from the composite synchronization signal in the range of the vertical synchronization signal region when the horizontal synchronization signal is not present in the region of the vertical synchronization signal.

A eighth aspect of the invention provides a horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising a discrimination means for discriminating the region of the vertical synchronization signal from the composite synchronization signal, a signal detection means for detecting a signal in the region of the vertical synchronization signal, a signal generation section for generating a horizontal synchronization gate signal approximately in phase with a horizontal synchronization signal detected from the composite synchronization signal and having a pulse width provided with a predetermined margin at least the front stage of the horizontal synchronization signal when a signal is detected by the signal detection means and, moreover, generating a pseudo horizontal synchronization signal approximately in phase with a horizontal synchronization signal detected from the composite synchronization signal and having a change point approximately matching the change point of a horizontal synchronization signal in the range of the vertical synchronization signal region when no signal is detected by the signal detection means, and an output means having an AND gate for computing a logical product when matching the polarity of a horizontal synchronizing gate signal or pseudo horizontal synchronization signal generated by the signal generation section with the polarity of the composite synchronization signal and outputting a signal output from the AND gate to the PLL as the horizontal synchronization signal.

A ninth aspect of the invention is the horizontal synchronization signal stabilization method of any one of the first, second, fifth or seventh aspects of the invention in which the polarity of the composite synchronization signal is converted to a polarity for generating an active pulse signal at either of preset positive and negative sides independent of the polarity of the composite synchronization signal.

A tenth aspect of the invention is characterized in that the polarity of the composite synchronization signal of any one of the third, fourth, sixth or eighth aspects of the invention is converted to a polarity for generating an active pulse signal at either of preset positive and negative sides independent of the polarity of the composite synchronization signal.

According to the first and third aspect of the invention, a horizontal synchronizing gate signal is generated in accordance with a composite synchronization signal. The polarity of the horizontal synchronization gate signal is matched to the polarity of a horizontal synchronization signal. Because the horizontal synchronization gate signal is generated by forecasting the horizontal synchronization signal generation region included in the composite synchronization signal, it is possible to securely fetch the horizontal synchronization signal by computing the logical product between the horizontal synchronization gate signal and the horizontal synchronization signal and also cancel a signal other than the horizontal synchronization signal but equivalent to the horizontal synchronization signal. Unless any horizontal synchronization signal is present in the vertical synchronization signal region included in the composite synchronization signal, it is possible to forecast the generation position of a horizontal synchronization signal in accordance with the horizontal synchronization gate signal.

According to the second and fourth aspect of the invention, a horizontal synchronization gate signal necessarily becomes active a predetermined time before a horizontal synchronization signal becomes active by setting a predetermined margin at least the front of the horizontal synchronization gate signal when a horizontal synchronization signal output is present in the vertical synchronization signal region included in a composite synchronization signal to detect the horizontal synchronization signal at its leading edge. Thereby, it is possible to compute an logical product on the basis of an original horizontal synchronization signal and securely detect the leading edge of the original horizontal synchronization signal.

According to the fifth and sixth aspect of the invention, unless any horizontal synchronization signal is present in the range of the vertical synchronization signal region, at least a signal (pseudo horizontal synchronization signal) having a change point approximately matching the change point of a horizontal synchronization signal is generated. For example, by recognizing the periodic data and pulse width data of a horizontal synchronization signal, it is possible to easily forecast the output timing of the horizontal synchronization signal and generate a pseudo horizontal synchronization signal by using a predetermined clock signal.

By computing the logical product between the pseudo horizontal synchronization signal thus generated (horizontal synchronization gate signal in case of the outside of the regional range of a vertical synchronization signal) and the original horizontal synchronization signal, it is possible to falsely obtain a horizontal synchronization signal even from the vertical synchronization signal region in which no horizontal synchronization signal is present by effectively using the change point (e.g., leading edge) of the original horizontal synchronization signal to the upmost.

According to the seventh and eighth aspect the invention, the vertical synchronization signal region is discriminated from a composite synchronization signal. That is, there are some composite synchronization signals which include horizontal synchronization signals in the vertical synchronization signal region or do not include any horizontal synchronization signal in the region. Because it is necessary to apply other processing to the signals, the vertical synchronization sign region is first discriminated. When a horizontal synchronization signal is present in the region of the vertical synchronization signal, a horizontal synchronization gate signal is generated in accordance with the composite synchronization signal and the horizontal synchronization signal is fetched from the vertical synchronization signal region by computing the logical product between the horizontal synchronization gate signal and the composite synchronization signal.

However, unless any horizontal synchronization signal is present in the region of the above vertical synchronization signal, a pseudo horizontal synchronization signal approximately matching the change point (e.g., leading edge) of the horizontal synchronization signal detected from the composite synchronization signal is generated in the range of the vertical synchronization signal region.

According to the ninth and tenth aspect of the invention, unless the polarity of an input composite synchronization signal is determined, it is necessary to change polarities depending on the signal in later processing, for example, when computing a logical product. Therefore, polarities are previously matched so that the composite synchronization signal becomes active at the positive or negative side. Thereby, it is unnecessary to change polarities depending on the signal and it is possible to smoothly perform stabilization.

BRIEF DESCRIPTION OF THE DRAWINGS:

FIG. 3 is a characteristic diagram for explaining a signal processing procedure for setting the polarity of a composite synchronization signal; and FIG. 4 is a characteristic diagram for explaining the type of a composite synchronization signal.

DETAILED DESCRIPTION OF THE PREFERRED EMBODIMENTS

Figure 1:
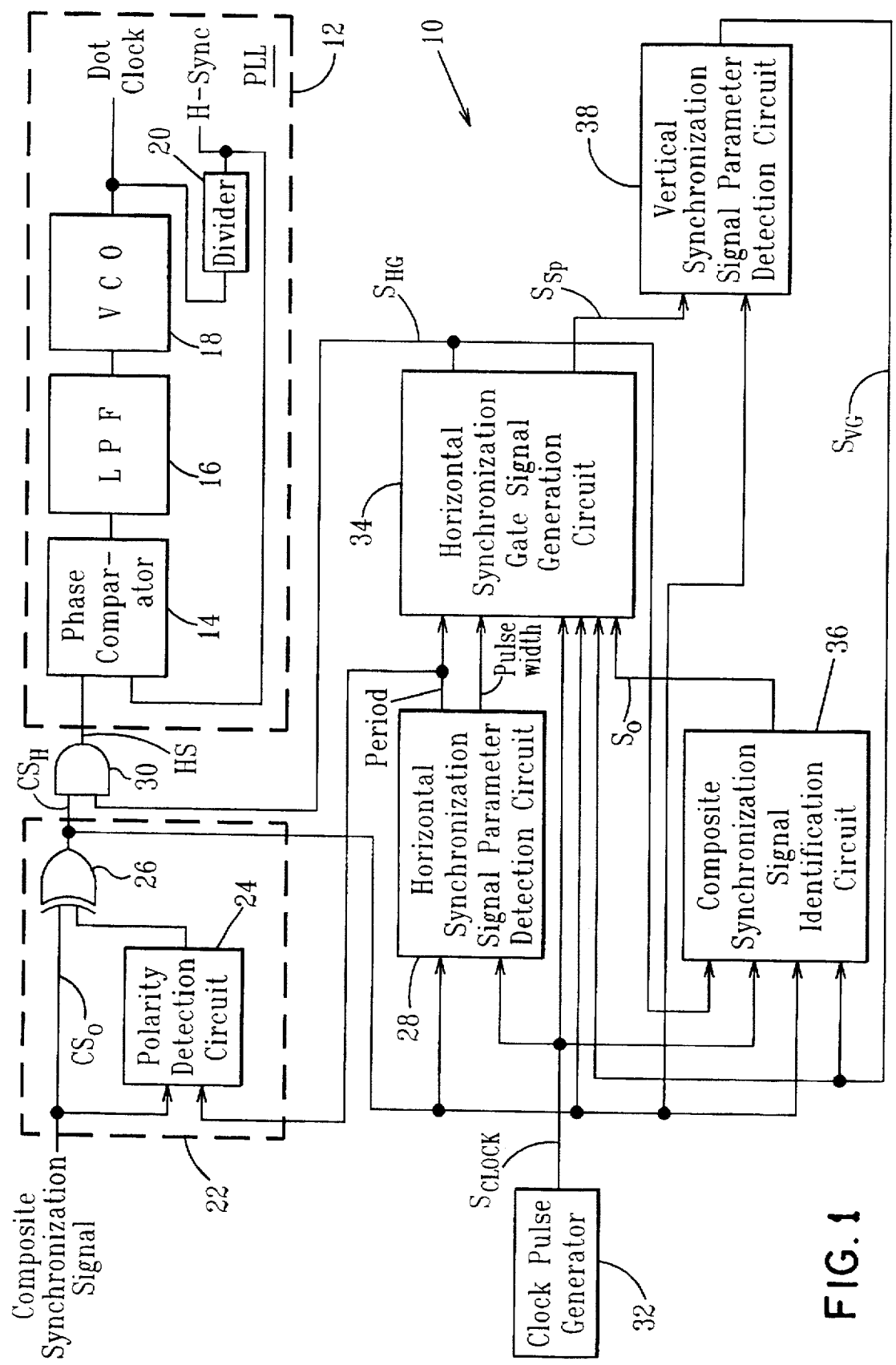
FIG. 1 is a schematic block diagram of the horizontal synchronization signal stabilization circuit of this embodiment.

FIG. 1 shows the horizontal synchronization signal stabilizing circuit 10 of this embodiment (hereafter referred to as a stabilization circuit).

The stabilization circuit 10 uses a composite synchronization signal $CS_O$ output to a system from a personal computer or workstation (not shown) as an input source, which applies a predetermined adjustment to the composite synchronization signal $CS_O$ and thereafter outputs it to a PLL 12.

The PLL 12 has a phase comparator 14 to which an adjusted horizontal synchronization signal HS is input from the stabilization circuit 10, sends a signal output from the phase comparator 14 to a voltage control oscillator (VCO) 18 through a low-pass filter (LPF) 16, divides an output signal of the VCO 18 by a divider 20, and returns the divided output signal to the phase comparator 14. This feedback makes it possible to match the phase of an input signal with that of an oscillation frequency of the VCO 18.

As a result, a dot clock signal serving as a basic clock (112 MHz in the case of this embodiment) is output from the VCO 18 and a horizontal synchronization signal (H-sync) is output from the divider 20.

The composite synchronization signal $SC_O$ is first input to a polarity conversion section 22 and converted to a signal for making the horizontal synchronization signal and vertical synchronization signal positively active independent of the polarity of a composite synchronization signal $SC_O$ output to the personal computer or workstation from a system. The polarity conversion section 22 comprises a polarity detection circuit 24 and an EX-OR (exclusive disjunction) gate 26 and the composite synchronization signal is input to both the polarity detection circuit 24 and the first input terminal of the EX-OR circuit 26. Periodic data output from a horizontal synchronization signal parameter detection circuit 28 to be described later is input to the polarity detection circuit 24 which decides a polarity in accordance with the input periodic data. The polarity decision can easily be made by detecting, for example, a horizontal synchronization signal level (H or L) around the middle of the output interval of the horizontal synchronization signal.

A low-level (L) signal is output from the polarity detection circuit 24 if the composite synchronization signal $CS_O$ is positively active and a high-level (H) signal is output from the circuit 24 if the signal $CS_O$ is negatively active, and it is input to the second input terminal of the EX-OR gate 26.

Figure 2A:
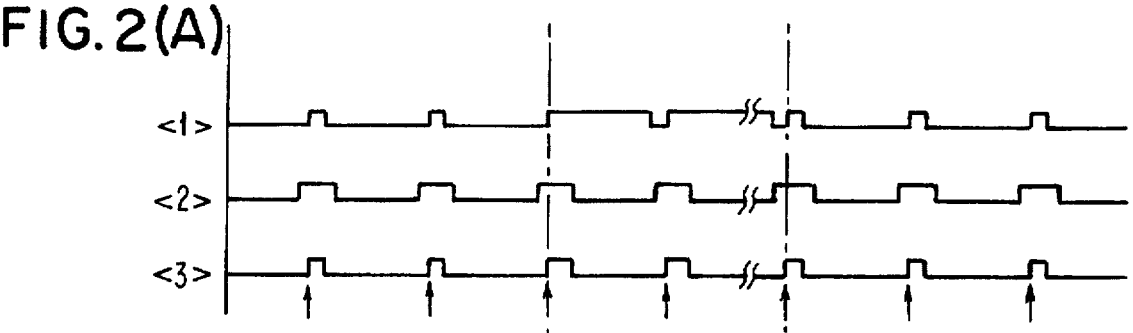
FIG. 2 is a timing chart showing a processing procedure for stabilizing a horizontal synchronization signal.
Figure 2B:
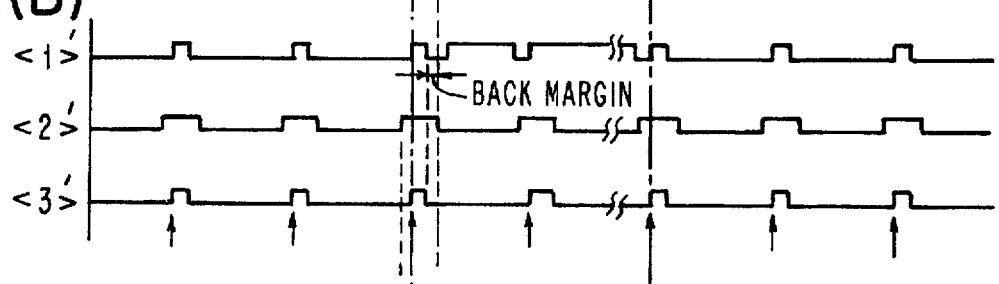
Figure 2C:
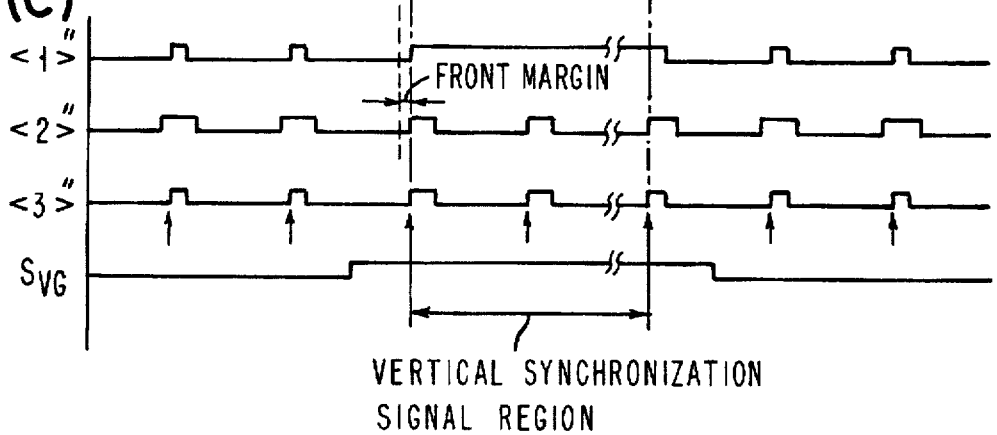

Therefore, the composite synchronization signals $CS_H$ which are made continuously positively active {see the signals <1>, <1>', and <1>" in FIGS. 2(A) to 2(C)} are output from the output terminal of the EX-OR gate 26. In this case, the signals <1>, <1>', and <1>" correspond to FIGS. 4(A), 4(B), and FIG. 4(C), respectively.

The output terminal of the EX-OR gate 26 is connected to the first input terminal of the AND gate 30 and the horizontal synchronization signal parameter detection circuit 28.

A horizontal synchronization gate signals SHG {see the signals <2>, <2>', and <2>" in FIGS. 2(A) to 2(C)} to be described later are input to the second input terminal of the AND gate 30 and the logical products of these signals are input to the PLL 12 as adjusted horizontal synchronization signals HS {see the signals <3>, <3>', and <3>" in FIGS. 2(A) to 2(C)}.

A clock pulse signal $S_{CLOCK}$ (50 MHz in the case of this embodiment) generated by a clock pulse generator 32 whose frequency is predetermined is input to the horizontal synchronization signal parameter detection circuit 28. The period and pulse width of the horizontal synchronization signal can be obtained by counting the number of pulses of the clock pulse signal $S_{CLOCK}$ in accordance with the output of the horizontal synchronization signal of the composite synchronization signal. Among these data, periodic data is sent to the polarity detection circuit 24.

The periodic data and pulse width data obtained by the horizontal synchronization signal parameter detection circuit 28 are supplied to a horizontal synchronization gate signal generation circuit 34. The composite synchronization signal $CS_H$ with a determined polarity is input to the horizontal synchronization gate signal generation circuit 34 from the EX-OR circuit 26 and, moreover, the clock pulse signal $S_{CLOCK}$ is input to the circuit 34 from the clock pulse generator 32.

In accordance with these signals, the horizontal synchronization gate signal generation circuit 34 first generates a pulse signal approximately in phase with the horizontal synchronization signal included in the composite synchronization signal $CS_H$ and a pulse signal having approximately the same period and pulse width as the horizontal signal in the vertical synchronization signal region.

In this case, a margin (pulse width to be added to the front and back of the pulse signal) for adjusting a pulse width is previously stored in the horizontal synchronization gate signal generation circuit 34 so that a predetermined margin can be added to the front and/or the back of the above generated pulse signal. It is desirable that the margin be about ½ or less the pulse width of a horizontal synchronization signal.

In this case, identification result signals $S_D$ are input to the horizontal synchronization gate signal generation circuit 34 from a composite synchronization signal identification circuit 36. When the identification result signals $S_D$ are at the low level (L), the margin is added to the front and back of the signals $S_D$ {see the signals <2> and <2>' in FIGS. 2(A) and 2(B)}. When the signals $S_D$ are at the high level (H), the front margin is canceled. The horizontal synchronization gate signal $S_{EG}$ thus generated {see the signal <2>" in FIG. 2(C)} is input to the second input terminal of the AND gate 30.

The composite synchronization signal $CS_H$ with a polarity determined by the polarity conversion section 22, the clock pulse signal $S_{CLOCK}$ output from the clock pulse generator 32, a signal (signal output from a vertical synchronization signal parameter detection circuit 38 to be described later, hereinafter referred to as a "vertical gate signal $S_{VG}$") showing the vertical synchronization signal region in a composite synchronization signal, and the horizontal synchronization gate signal $S_{HG}$ generated by the horizontal synchronization gate signal generation circuit 34 are input to the composite synchronization signal identifying circuit 36.

The composite synchronization signal identification circuit 36 samples the composite synchronization signal $CS_H$ in the vertical synchronization signal region and identifies whether a pulse signal is present in a region from which a horizontal synchronization signal output from the horizontal synchronization gate signal generation circuit 34 is forecasted to be output. When the pulse signal is present in the region, it is determined to be a signal like the one in FIG. 4(A) or 4(B) and the circuit 36 outputs the identification signal $S_D$ at the low level (L) to the horizontal synchronization gate signal generation circuit 34. When the pulse signal is not present in the region, it is determined to be a signal like the one in FIG. 4(C) and the circuit 36 outputs the identification signal $S_D$ at the high level (H) to the circuit 34.

The composite synchronization signal $CS_H$ with a polarity determined by the polarity conversion section 22 and a sampling position signal $S_{SP}$ output from the horizontal synchronization gate signal generation circuit 34 are input to the vertical synchronization signal parameter detection circuit 38. The sampling position signal $S_{SP}$ is a signal for determining the timing for discriminating the state (H or L) of a composite synchronization signal, which is set, for example, around the middle of the inactive region of a horizontal synchronization signal. It is possible to determine that this sampling position is the vertical synchronization signal output region when the composite synchronization signal $CS_H$ is at the high level and, moreover, decide that the point in time when the composite synchronization signal first comes to the low level is the first one of the main scanning lines. Therefore, when the number of scanning lines is previously known (1,056 lines in the case of this embodiment), it is possible to forecast the next vertical synchronization signal output timing. Thus, a signal obtained by adding a margin approximately ½ the period of a horizontal synchronization signal to the front and back of the next vertical synchronization signal is output to the composite synchronization signal identification circuit 36 as a vertical gate signal.

The following is a description of the functions of this embodiment:

When the composite synchronization signal $CS_O$ is input to the stabilization circuit 10 from a system such as a personal computer or workstation, the polarity conversion section 22 inputs the signal $CS_O$ to the polarity detection circuit 24 in order to convert the signal $CS_O$ to a positively active signal. The periodic data detected by the horizontal synchronization signal parameter detection circuit 28 is input to the polarity detection circuit 24 which determines a sampling position in accordance with the period data. The sampling position is set around the middle between horizontal synchronization signals as shown by the broken line in FIG. 3 and the polarity of the composite synchronization signal $CS_O$ is detected.

From the result of detecting the polarity, the signal $CS_O$ can be determined to be a positive active signal when the signal $CS_O$ is at the low level and as a negative active signal when the signal $CS_O$ is at the high level.

When the signal $CS_O$ is determined to be positive active, a low-level (L) signal is output to the second input terminal of the EX-OR gate 26 from the output terminal of the polarity detection circuit 24. However, when the signal $CS_O$ is decided to be negative active, a high-level (H) signal is output to the second input terminal of the EX-OR gate 26 from the output terminal of the polarity detection circuit 24.

Because the composite synchronization signal $CS_O$ is input to the first output terminal of the EX-OR gate 26, the positive active composite synchronization signal $CS_H$ can continuously be output from the output terminal.

As described above, the composite synchronization signal $CS_H$ decided as a positive active signal is input to the horizontal synchronization signal parameter detection circuit 28 to compute the periodic data and pulse width data of a horizontal synchronization signal included in the composite synchronization signal $CS_H$. That is, the clock pulse signal ScLocK is input to the horizontal synchronization signal parameter detection circuit 28 from the clock pulse generator 32 and therefore it is possible to confirm the period and pulse width of the horizontal synchronization signal by counted values by counting with the number of clock pulses from the leading to trailing edges and from the leading edge to the next trailing edge of the horizontal synchronization signal of the composite synchronization signal $CS_H$.

The recognized periodic data and pulse width data are output to the horizontal synchronization gate signal generation circuit 34. Moreover, as described above, these pieces of periodic data are used as parameters for determining the sampling position in the polarity detection circuit 24.

Not only the above periodic data and pulse width data but also the composite synchronization signal $CS_H$ and the clock pulse signal $S_{CLOCK}$ are input to the horizontal synchronization gate signal generation circuit 34 which first outputs the sampling position signal $S_{SP}$ necessary for recognizing the region of a vertical synchronization signal to the vertical signal parameter detection circuit 38. The sampling position specified by the sampling position signal is around the middle of the horizontal synchronization signal interval.

The composite synchronization signal $CS_H$ is input to the vertical synchronization signal parameter detection circuit 38 and thereby the circuit 38 decides the polarity specified by the sampling position signal $S_{SP}$ and decides that the signal $CS_H$ is in the vertical synchronization signal region when the signal $CS_H$ is at the high level. Moreover, the number of scanning lines is previously stored in the vertical synchronization signal parameter detection circuit 38.

Because it can be determined that the point in time when the polarity detection comes to the low level at the position specified by the sampling position signal $S_{SP}$ is the first scanning line, it is possible to obtain the end timing of a vertical synchronization signal. Thereafter, the start timing of the vertical synchronization signal can be obtained by counting signals until the number of signals matches the number of scanning lines.

The vertical synchronization signal parameter detection circuit 38 adds a predetermined margin at the start and end of the obtained vertical synchronization signal and outputs a high-level signal (vertical gate signal $S_{VG}$) in the region when the margin is added and the vertical synchronization signal region.

The output signal is input to the horizontal synchronization gate signal generation circuit 34 and the composite synchronization signal identification circuit 36.

Not only the vertical gate signal $S_{VG}$ but also the composite synchronization signal $CS_H$, the clock pulse signal $S_{CLOCK}$ and the horizontal synchronization gate signal $S_{HG}$ generated by the horizontal synchronization gate signal generation circuit 34 are input to the composite synchronization signal identification circuit 36.

In this case, it is possible to determine only the vertical synchronization signal region of the composite synchronization signal $CS_H$ by the vertical gate signal $S_{VG}$. Moreover, the polarity of the inactive region of a horizontal synchronization signal obtained in accordance with the horizontal synchronization gate signal $S_{HG}$ and the clock pulse signal $S_{CLOCK}$ is decided. That is, when all regions of the horizontal synchronization signal out of the active state are the high level, it is possible to determine that the horizontal synchronization signal is the signal of <1>" in FIG. 2(C). For cases other than the above, it is possible to determine that the horizontal synchronization signal is the signal of <1> in FIG. 2(A) or that of <1>' in FIG. 2(B).

The composite synchronization signal identification circuit 36 outputs the high-level identification signal $S_D$ to the horizontal synchronization gate signal generation circuit 34 only when the circuit 36 identifies the signal of <1>" in FIG. 2(C).

Thereby, the horizontal synchronization gate signal generation circuit 34 can recognize the type of the composite synchronization signal $CS_H$.

When the composite synchronization signal $CS_H$ is the signal of <1> in FIG. 2(A) or the signal of <1>' in FIG. 2(B), the horizontal synchronization gate signal generation circuit 34 generates the horizontal synchronization gate signal $S_{HG}$ in which a predetermined margin is added to the front and back of a pulse signal obtained through a composite synchronization signal $CS_H$, periodic data, pulse width data, and the clock pulse signal $S_{CLOCK}$. When the signal $CS_H$ is the signal of <1>" in FIG. 2(C), the circuit 34 generates the horizontal synchronization gate signal $S_{HG}$ canceling the front margin in the vertical synchronization signal region recognized by the vertical gate signal $S_{VG}$. In this case, the horizontal synchronization gate signal $S_{HG}$ is used as a pseudo horizontal synchronization signal.

The horizontal synchronization gate signal $S_{HG}$ thus generated is input to the second input terminal of the AND gate 30 and a logical product is computed between the signal $S_{HG}$ and the composite synchronization signal $CS_H$ input to the first input terminal of the circuit 30.

As a result, as shown by <3> in FIG. 2(A), it is possible to securely obtain a horizontal synchronization signal even in the vertical synchronization signal region in the case of the so-called normal composite synchronization signal $CS_H$.

Moreover, in the case of the composite synchronization signal $CS_H$ having a so-called cirrus, the cirrus in the vertical synchronization signal region is canceled and a horizontal synchronization signal can securely be obtained as shown by <3>' in FIG. 2(B).

Furthermore, in the case of the composite synchronization signal $CH_H$ the leading edge of the horizontal synchronization gate signal $S_{HG}$ can determined incorrectly to be a horizontal synchronization signal and can be fetched as an almost accurate horizontal synchronization signal as shown by <3>" in FIG. 2(C).

The fetched horizontal synchronization signal is input to the PLL 12 and provided with predetermined processing. Thereby, a dot clock pulse and a horizontal synchronization signal can be obtained.

Thus, because a horizontal synchronization signal can be fetched even from the vertical synchronization signal region by stabilizing the composite synchronization signal $CS_O$ before it is input to the PLL 12, it is possible to stably perform the processing in the PLL 12 and output a clear image to a digital display such as an LCD without disturbing the image.

As described above, the horizontal synchronization signal stabilization method and apparatus of the present invention make it possible to obtain an excellent advantage such that even different types of input composite synchronization signals can be converted to signals for continuously stabilizing the processing in a PLL.

We claim:

1. A horizontal synchronization signal stabilization method for stabilizing a horizontal synchronization signal serving as an input signal for a phase-locked loop (PLL) for generating a clock signal by separating the horizontal synchronization signal from a composite synchronization signal including horizontal and vertical synchronization signals, comprising the steps of:

generating a horizontal synchronization gate signal for outputting a pulse signal approximately in phase with the horizontal synchronization signal and having at least the pulse width of the horizontal synchronization signal in accordance with the composite synchronization signal and a clock pulse signal having a predetermined frequency; and retrieving the horizontal synchronization signal from the composite synchronization signal in accordance with a logical product when matching the polarity of the horizontal synchronization gate signal with the polarity of the composite synchronization signal.

2. The horizontal synchronization signal stabilization method according to claim 1, wherein the horizontal synchronization gate signal becomes active a predetermined time before a horizontal synchronization signal in the composite synchronization signal becomes active.

3. The horizontal synchronization signal stabilization method according to claim 1 wherein the polarity of the composite synchronization signal is converted to a polarity for generating an active pulse signal at either of preset positive and negative sides independent of the polarity of the composite synchronization signal.

4. A horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising:

a horizontal synchronization gate signal generation section for generating a horizontal synchronization gate signal for outputting a pulse signal approximately in phase with the horizontal synchronization signal and having at least the pulse width of the horizontal synchronization signal in accordance with the composite synchronization signal and a clock pulse signal having a predetermined frequency; and an output means having an AND gate for computing a logical product when matching the polarity of the horizontal synchronization gate signal generated by the horizontal synchronization gate signal generation section with the polarity of the composite synchronization signal and outputting a signal output from the AND gate to the PLL as the horizontal synchronization signal.

5. The horizontal synchronization signal stabilization apparatus according to claim 3 wherein a polarity conversion means is included which converts the polarity of the composite synchronization signal to a polarity for generating an active pulse signal at either of preset positive and negative sides independent of the polarity of the composite synchronization signal.

6. The horizontal synchronization signal stabilization apparatus according to claim 4, wherein the horizontal synchronization gate signal generation section is provided with a margin for making the horizontal synchronization gate signal active a predetermined time before at least the horizontal synchronization signal becomes active.

7. A horizontal synchronization signal stabilization method for stabilizing a horizontal synchronization signal serving as an input signal for a phase-locked loop (PLL) for generating a clock signal by separating the horizontal synchronization signal from a composite synchronization signal in which no horizontal synchronization signal is present in the regional range of a vertical synchronization signal, comprising the steps of:

discriminating the region of the vertical synchronization signal from the composite synchronization signal; and generating a pseudo horizontal synchronization signal having a change point approximately matching the change point of a horizontal synchronization signal detected from the composite synchronization signal in the range of the vertical synchronization signal region in accordance with a clock pulse signal having a predetermined frequency.

8. A horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising:

a discrimination means for discriminating the region of the vertical synchronization signal from the composite synchronization signal;

a pseudo horizontal synchronization signal generation section for generating a pseudo horizontal synchronization signal having a change point approximately matching the change point of a horizontal synchronization signal detected from the composite synchronization signal in the range of the vertical synchronization signal region; and an output means having an AND gate for computing a logical product when matching the polarity of the pseudo horizontal synchronization signal generated by the pseudo horizontal synchronization signal generation section with the polarity of the composite synchronization signal and outputting a signal output from the AND gate to the PLL as the horizontal synchronization signal.

9. A horizontal synchronization signal stabilization method for stabilizing a horizontal synchronization signal serving as an input signal for a phase-locked loop (PLL) for generating a clock signal by separating the horizontal synchronization signal from a composite synchronization signal including horizontal and vertical synchronization signals, comprising the steps of:

discriminating the region of the vertical synchronization signal from the composite synchronization signal;

generating a horizontal synchronization gate signal in accordance with the composite synchronization signal when the horizontal synchronization signal is present in the region of the vertical synchronization signal;

fetching the horizontal synchronization signal from the vertical synchronization signal region by computing a logical product when matching the polarity of the horizontal synchronization gate signal with the polarity of the composite synchronization signal; and generating a pseudo horizontal synchronization signal approximately matching the horizontal synchronization signal detected from the composite synchronization signal in the range of the vertical synchronization signal region when the horizontal synchronization signal is not present in the region of the vertical synchronization signal.

10. A horizontal synchronization signal stabilization apparatus for stabilizing a horizontal synchronization signal serving as an input signal for a phase-locked loop (PLL) for generating a clock signal by separating the horizontal synchronization signal from a composite synchronization signal including horizontal and vertical synchronization signals, comprising:

discrimination means for discriminating the region of the vertical synchronization signal from the composite synchronization signal;

a signal detection means for detecting a signal in the region of the vertical synchronization signal;

a signal generation section for generating a horizontal synchronization gate signal approximately in phase with a horizontal synchronization signal detected from the composite synchronization signal and having a pulse width provided with a predetermined margin at at least the front of the horizontal synchronization signal when a signal is detected by the signal detection means and, moreover, generating a pseudo horizontal synchronization signal approximately in phase with a horizontal synchronization signal detected from the composite synchronization signal and having a change point approximately matching the change point of a horizontal synchronization signal in the range of the vertical synchronization signal region when no signal is detected by the signal detection means; and an output means having an AND gate for computing a logical product when matching the polarity of a horizontal synchronization gate signal or pseudo horizontal synchronization signal generated by the signal generation section with the polarity of the composite synchronization signal and outputting a signal output from the AND gate to the PLL as the horizontal synchronization signal.

* * * * *

UNITED STATES PATENT AND TRADEMARK OFFICE
CERTIFICATE OF CORRECTION

PATENT NO. : 5,790,200
DATED       : August 4, 1998
INVENTOR(S) : Hiroyuki Tsujimoto, et al.

It is certified that error appears in the above-identified patent and that said Letters Patent is hereby corrected as shown below:

Column 2, line 50: delete "is"

Column 3, line 43: "A eighth" should read --An eighth--

Column 5, line 9: "aspect the" should read --aspects of the--

Column 6, line 47: "SHG" should read --$S_{HG}$--

Signed and Sealed this

Nineteenth Day of October, 1999

Attest:

Attesting Officer

Q. TODD DICKINSON

Acting Commissioner of Patents and Trademarks